May 24, 1955

R. D. WELLINGTON ET AL 2,708,919

DIESEL ENGINE CONTROL SYSTEM

Filed May 27, 1952

INVENTORS
Roger D. Wellington &
BY Herbert H. Black

Willits, Helwig & Baillio
ATTORNEYS

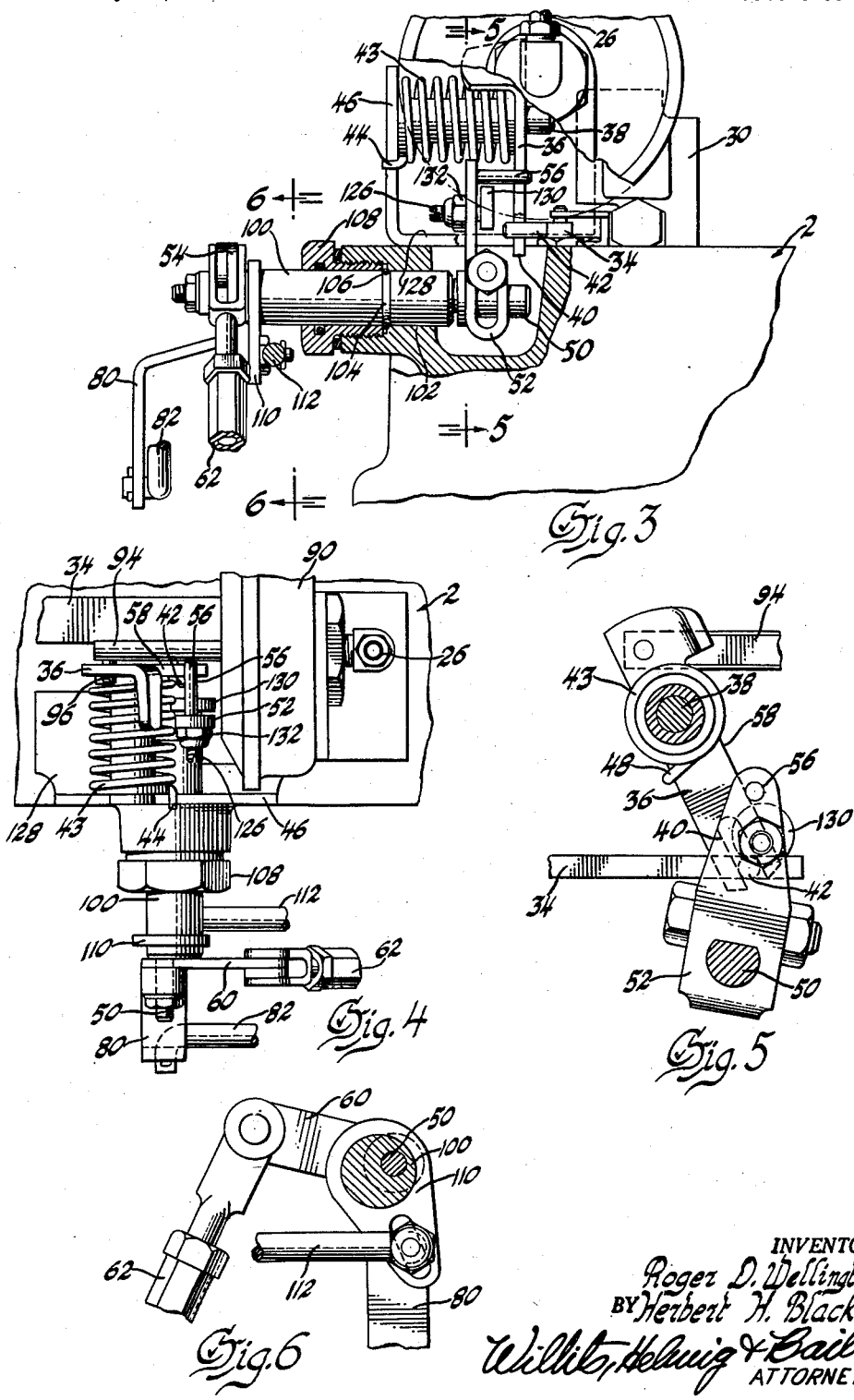

May 24, 1955   R. D. WELLINGTON ET AL   2,708,919
DIESEL ENGINE CONTROL SYSTEM

Filed May 27, 1952   3 Sheets-Sheet 3

INVENTORS
Roger D. Wellington &
BY Herbert H. Black
Willits, Helwig & Baillio
ATTORNEYS United States Patent Office 2,708,919
Patented May 24, 1955

2,708,919

DIESEL ENGINE CONTROL SYSTEM

Roger D. Wellington, Detroit, and Herbert H. Black, East Grand Rapids, Mich., assignors to General Motors Corporation, Detroit, Mich., a corporation of Delaware Application May 27, 1952, Serial No. 290,128

13 Claims. (Cl. 123—119)

This invention relates to diesel engines in which the fuel is supplied by means of a unit fuel injector pump associated with each engine working cylinder and the air for supporting combustion is supplied by a supercharging blower, and both the fuel injector pump and the blower are either directly driven by or are otherwise operated in timed relation with the engine operating cycle. The invention particularly concerns improved means for controlling the engine operating speed and for regulating the amount of fuel injected in accordance with the blower intake and outlet pressures to maintain proper air-fuel ratios at all engine operating speeds.

Reference is made to the prior application of Charles E. Ervin, Jr., S. N. 157,556, filed April 22, 1950, now Patent No. 2,617,396, issued November 11, 1952, in which there is disclosed means for manually controlling the injection pump fuel delivery rate, together with blower intake pressure responsive means effective to take over the injection pump control from the manual means to prevent engine overspeeding and stalling at engine idling speeds. It is a well known fact that fuel injector pumps of the so-called "unit" type, as exemplified in the Fielden U. S. Patent 1,981,913, tend to inject a greater quantity of fuel per cycle at low operating speeds than at higher speeds, apparently on account of a loss of pumping efficiency accompanying greater fuel injection pressures developed at the higher speeds. In order to maintain fuel/air ratios below the smoke limit it is therefore necessary to take into account this inherent change in fuel pumping efficiency of the injector with change in operating speed.

It is accordingly an object of the present invention to improve the manual and governor control of the engine as provided by said Ervin device by incorporating means in the mechanism thereof for effecting automatic modulation of the fuel injection rate to prevent excessive fuel being supplied to the engine at the lower engine and injector operating speeds.

A further object of the invention is to provide apparatus which may be conveniently adapted to the engine to effect such modulation of the fuel injector control, in conjunction with manual and other automatic governor means for controlling the engine speed through control of the injector pump delivery.

The means by which these and other objects of the invention are obtained will be apparent from the following description, having reference to the drawings wherein:

Figure 3 is an elevational view taken from the right of Figure 2, with parts broken away and in section.

Figure 4 is a fragmentary top view of the apparatus of Figures 2 and 3.

Figures 5 and 6 are fragmentary sectional views taken on lines 5—5 and 6—6 of Figure 3, respectively.

Figure 7:
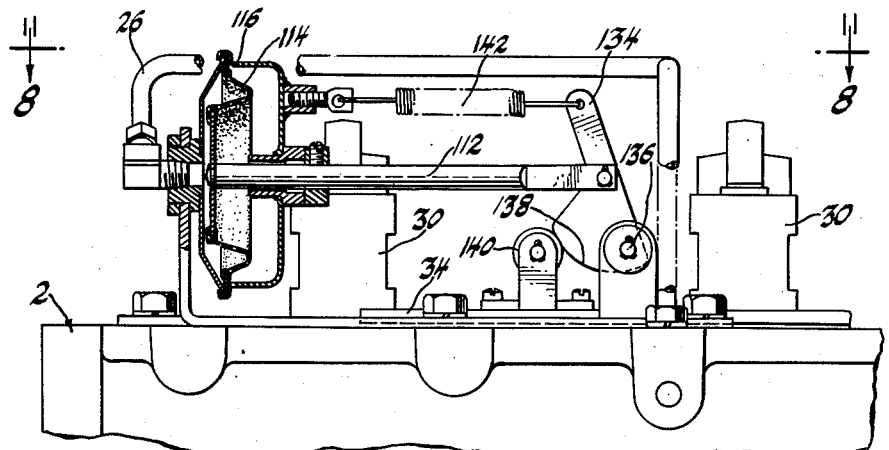

Figure 7 is a side elevational view of a portion of the engine showing a modified form of the fuel modulating mechanism.

Figure 8:
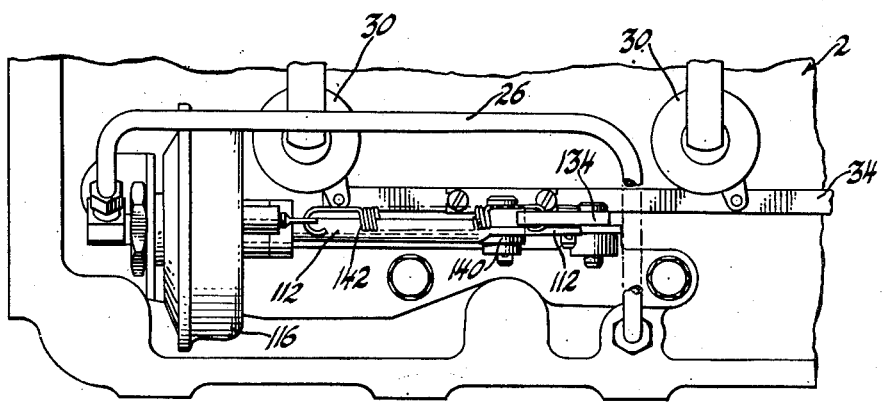

Figure 8 is a plan view taken from line 8—8 of Figure 7.

Referring now to the drawings in detail, and first to Figures 1-6, the numeral 2 designates generally the frame of a conventional diesel engine having one or more cylinders 4, each fixed with a piston 6 driving a connecting rod 8 in conventional manner. Surrounding the cylinder 4 is an air box 10 supplied with supercharged air for combustion and scavenging of the cylinder, the air being compressed in the air box by a suitable blower indicated at 12 which is driven directly by or at least in timed relation to the engine crankshaft (not shown) to which the connecting rod 8 is connected. The air inlet 14 to the blower is supplied by a main air delivery passage 16 controlled by a throttle valve 18, and adjacent this main passage 16 is a smaller venturi passage 20 which also connects with the blower inlet 14. The throttle valve 18 is shown in full open position in Figure 1, but may be moved therefrom to any desired degree of open position by the throttle valve control link 22. The venturi passage 20 provides means for obtaining a sensitive measurement of the blower intake air pressure and for this purpose the throat of the venturi is tapped by the fluid pressure line 24. Blower delivery pressure as measured in the air box 10 is in turn tapped by a fluid pressure line 26. The particular engine shown is of the two-cycle type wherein air from the air box 10 is admitted into the cylinder during each operating cycle through a cylinder inlet port 28 controlled by the piston 6.

Fuel may be introduced into the cylinder at any desired point in the combustion chamber (not shown) located above the piston. It will be understood that the fuel injectors (one of which is generally indicated at 30 in Figure 3) are of the unit type, each having a pumping cylinder fitted with a plunger, driven either mechanically or by engine compression pressure, with the pumping chamber leading to a discharge nozzle through which the fuel is injected into the engine cylinder combustion chamber. The particular design of the injectors to be used is not pertinent to the present invention, it being only necessary that the injection pump delivery rate be controllable by an exteriorly accessible element or control rod, such as shown at 34 in Figures 2-5.

The rod 34 may control a plurality of fuel injector pumps for different cylinders of a multi-cylinder engine and is guided for longitudinal sliding movement on the engine frame for this purpose. Movement of the control rod to the left, as viewed in Figure 2, effects a reduction in the injector pump delivery rate, and conversely movement of this rod in the opposite direction effects an increase in the pump delivery rate. A control rod actuating member in the form of a lever 36 is shown which is mounted for rotation about a fixed axis on which it is supported by the shaft 38. One end of this lever 36 is connected to the rod 34 as by providing the lever with a notch 40 slidably receiving a pin 42 on the rod 34. Suitable means for biasing the rod 34 toward the maximum fuel injection position is provided, and as shown, this means is in the form of a torsionally stressed helical spring 43, one end 44 of which is fixed to a stationary bracket 46 supporting the lever shaft 38 and the other end 48 of the spring 43 is anchored to the lever 36. The torsion spring 43 thereby operates to rotate the lever 36 about the axis of shaft 38 in a counterclockwise direction as viewed in Figure 2, and by means of its connection with the notched end of the lever 36 the injector control rod 34 is urged at all times toward its maximum fuel injection position.

Figure 1:
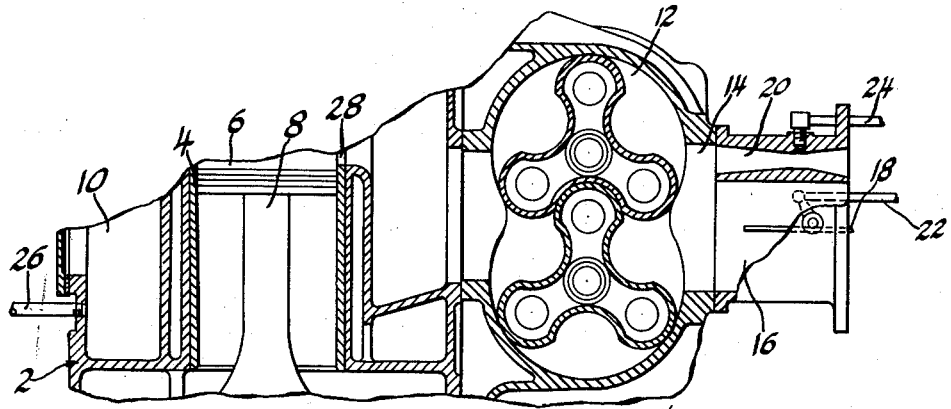
Figure 1 is a generally diagrammatic view of a portion of an internal combustion engine, of the type to which the present invention is applicable, wherein supercharged air is supplied to the working cylinder by a blower whose air intake pressure is variable with engine speed.
Figure 2:
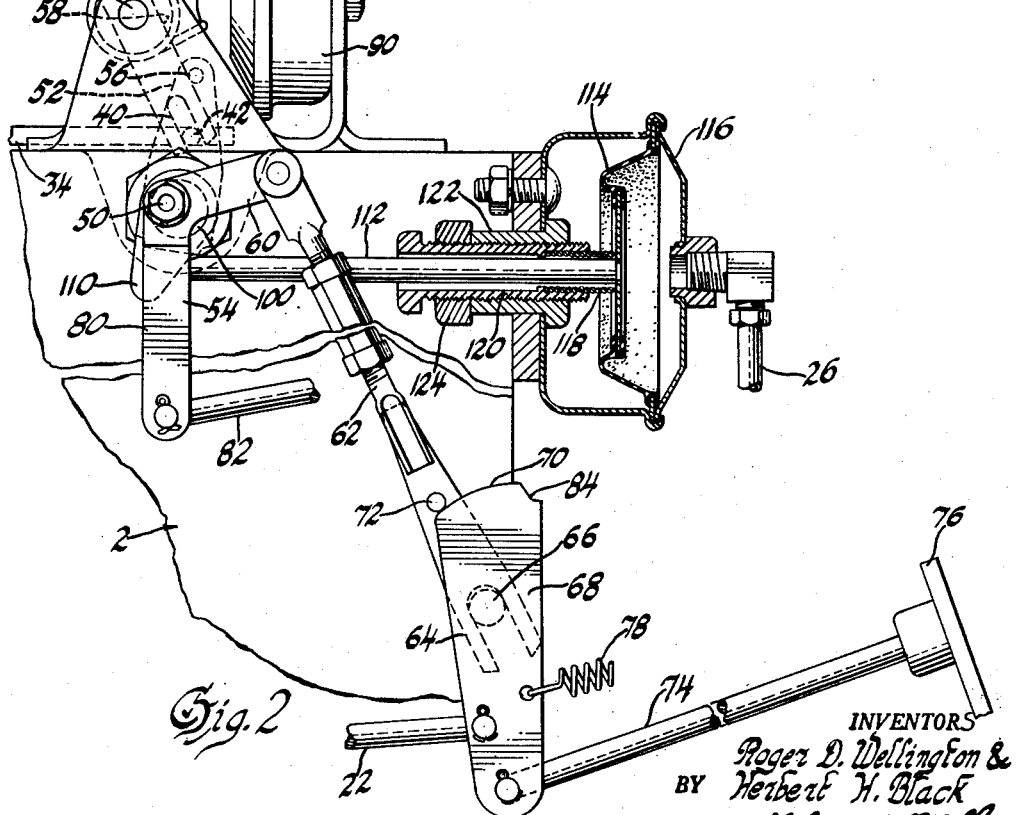
Figure 2 is an enlarged fragmentary view, partially diagrammatic, of one form of the fuel injector control system of the invention applied to the engine of Figure 1, certain parts being broken away and in section.

Mounted in the engine frame 2 for axial rotation is a shaft 50, to the opposite ends of which are fixed a single arm lever 52 and a double arm lever 54. The single arm lever 52 carries a stop means for the actuating lever 36 shown in the form of a pin 56 which is arranged to engage the side 58 of the actuating lever 36. One arm 60 of the double-armed lever 54 is pivotally connected to one end of a longitudinally adjustable push rod 62 whose opposite end is shown notched as at 64 and slidably engaging a shaft 66. Pivotable about the axis of shaft 66 is a cam member 68 having a cam surface 70 in slidable engagement with a pin 72 fixed to the push rod 62. The cam member 68 is manually rotatable about the shaft 66 by a link 74 connected in suitable manner to a foot accelerator 76. It will be seen that the single-arm lever 52 with its pin 56, shaft 50, double-arm lever 54, push rod 62, cam member 68 and link 74 provides a lost-motion connection between the foot accelerator 76 and the control rod actuating lever 36. Suitable resilient means tending to take up this lost motion is provided in the form of a tension spring 78 which rotates the cam member in a counterclockwise direction from its position, as shown in Figure 2, when foot pressure is relieved from the accelerator pedal 76. Rotation of the cam member 68 also operates through the link 22 to control the position of the throttle valve 18 in the blower intake main passage 16, as shown in Figure 1. With the parts thus far described in their positions shown in Figures 1–6, the foot accelerator 76 is in its fully depressed position, holding the air throttle valve fully open. In this position the pin 72 on the push rod 62 is at its lowest position on the cam surface 70, and the single arm lever 52 is in its extreme clockwise position, whereby the pin 56 permits the actuating lever 36 to assume its extreme counterclockwise position under the biasing action of the torsion spring 43 and hold the injector pump control rod 34 in its "full fuel" position. Upon relieving pressure from the accelerator pedal 76 the spring 78 is effective to rotate the cam member 68 counterclockwise, causing the pin 72 to ride up on the cam surface 70, and thereby transmit clockwise rotation to the actuating lever 36, through the push rod 62, arm 60, shaft 50, lever 52 and pin 56. The spring 78 being stronger than the torsion spring 43, the latter is forced to yield during this clockwise rotation of the actuating lever 36, and the injector control rod 34 is moved to the left as viewed in Figure 2 toward a reduced fuel injection setting. Simultaneously, with this counterclockwise movement of the cam member 68, the throttle valve is moved by the link 22 toward a closed position in the blower inlet main passage 16.

This rotation of the cam member 68 thus results in less fuel and air being supplied the engine whereby the engine speed is reduced. The other arm 80 of the double-armed lever 54 is connected to a hand operated pull rod 82, providing means for shutting off the engine as will be later described.

In the event the engine tends to overspeed, as a result of a decrease in load or for any other reason, clockwise rotation of the actuating lever 36 against the biasing action of the torsion spring 43 will be effected by means now to be described to move the injector control rod 34 toward a reduced fuel injection setting, independently of the position of the pin 56 as determined by either the position of the foot accelerator 76 or the hand control link 82. For this purpose there is provided a suitable pressure responsive means in the form of a cylinder 90 having a movable diaphragm or piston member 92 therein which is connected as by the link 94 and pin 96 to the actuating lever 36. One end of the cylinder 90 is connected by the pipe 24 to the throat of the venturi 20 and the other end of the cylinder 90 communicates by suitable means (not shown) to atmosphere. As a result, the high vacuum generated in the throat of the venturi during excessive engine (and blower) operating speed actuates the piston 92 to the right, as viewed in Figure 2, and moves the injector control rod to the left by means of the link 94 and actuating lever 36. During operation of the engine at normal operating speeds insufficient vacuum is present in the cylinder 90 to interfere with movement of the link 94 during manual control of the actuating lever 36.

In order to modulate the control of the position of the control rod 34 in accordance with the engine operating speed, and thereby prevent excessive injector pump fuel delivery and resultant engine "smoking," additional means are provided as are now to be described. Such modulating means, in the form illustrated in Figures 2–6 of the drawings comprises a second shaft 100 journalling the shaft 50. The shaft 100 is in turn journalled in a bore 102 provided in the engine frame 2 for axial rotation about an axis which, as best shown in Figure 6, is eccentric to the axis of shaft 50. Suitable means is provided for securing the shaft 100 against endwise movement in the bore 102, as by providing the shaft 100 with an external circumferential groove 104 intermediate its ends, which groove is engaged by a snap ring 106 held between a sleeve nut 108 and the bottom of a counterbore into which the nut 108 is threadedly received.

As will be seen in Figures 2 and 6, the eccentric relation of the axes of shafts 50 and 100 is in acute angular relation to the longitudinal axis of the actuating lever 36, whereby rotation of the shaft 100 in a clockwise direction as viewed in Fig. 2 causes the pin 56 to move in a direction both away from the side 58 of the actuating lever 36 and approaching the actuating lever supporting shaft 38. Movement of the pin 56 away from the actuating lever side 58 permits the torsion spring to rotate the actuating lever further in a counterclockwise direction, with resultant further movement of the injector control rod toward an increased fuel setting. Contrariwise, the aforementioned eccentric relation of the shafts 50 and 100 causes the pin 56, during counterclockwise rotation of the shaft 100, to engage and drive the actuating lever 36 in a clockwise direction with corresponding reduction in fuel injector pump delivery. Also, by reason of this angular relation of the axes of shafts 50 and 100 to the actuating lever 36, rotation of the shaft 100 causes a change in the distance of the pin 56 from the actuating lever shaft 38, thereby varying the amount which the actuating lever 36 is rotated for a given change in angular position of the shaft 50 by the manual control means.

To provide control of the angular position of the shaft 100 about its axis, an arm 110 is fixed to the shaft 100 and is pivotally connected to one end of a link 112 which is longitudinally movable in response to change in engine speed. Connected to the opposite end of the link 112 is a pressure actuated piston member in the form of a flexible diaphragm 114 disposed in a cylinder 116. Resilient means in the form of a compression spring 118 is arranged between the diaphragm 114 and an adjustable fixed abutment 120 so as to urge the link toward the right, as viewed in Figure 2, and effect counterclockwise rotation of the shaft 100. The interior of the cylinder 116 on the opposite side of the diaphragm from the spring 118 is connected by the pipe 26 to the engine air box 10, whereby during engine operation the relative position of the link 112 will be controlled in accordance with engine operating speed as represented by the air box pressure. The abutment member 120 is made adjustable to vary the biasing force of the spring 118 and is in the form of a sleeve threadedly received in a stationary outer sleeve 122 and carrying a lock nut 124.

Under engine idling conditions (all pressure having been relieved from the accelerator pedal 76) the pin 72 passes off the high end of the cam surface 70 onto the step 84 and the throttle valve 18 reaches a substantially closed position in the main air passage 16. This causes the pin 56 to leave the side 58 of the actuating lever and the engine air supply to be restricted to the volume of air reaching the blower inlet through the venturi 20. The resulting increased vacuum at the venturi throat is applied through the pipe 26 to the piston member 92, causing the latter to act through the link 94 to limit further counterclockwise rotation of the actuating lever 36 and consequent movement of the injector control rod 34 to the full "off" position.

When desired to shut down the engine from "idle," the operator may pull rod 82 to the right as viewed in Figure 2, causing the shaft 50 to rotate counterclockwise independently of the cam member 68 a sufficient amount for the pin 56 to re-engage and move the actuating lever clockwise against the force of the torsion spring 43 and thereby shift the injector control rod 34 to its full "off" position. An idle buffer spring adjustment, as best shown in Figures 3 and 4, is provided in the form of an eccentric 130 which is secured to the lever 52 by a threaded pin 126 and locknut 132.

Referring now to Figures 7 and 8, there is shown a modified form of the fuel modulating means wherein the cylinder 116 has its diaphragm 114 connected by the link 112 to a pivoted cam plate 134. The cam plate 134 is suitably supported on the engine frame for rotation by the link 112 about a stationary axis 136, and is provided with a cam surface 138 engageable by a member such as the roller 140 carried by the injector control rod 34. It will be understood that the control rod 34 is biased toward its maximum fuel injection control position by any suitable biasing means, such as the previously described torsion spring 43 and actuating lever 36. Also, any suitable manual control means for moving the control rod 34 toward a reduced fuel injection position in opposition to the biasing means may be provided, such as the foot accelerator 76 and associated linkage previously described. In this form of the invention, the eccentric shaft 100 and its rotating means previously described are omitted, and the movement of the injector control rod 34 in response to engine speed (air box pressure) is instead effected by rotation of the cam plate 134 about its axis 136. The shape of the cam surface 138 may be selected as desired to obtain the necessary modulation of the injector pump delivery rate with respect to engine speed. The tension spring 142 serves to effect return of the link 112 and cam plate 134 with decreasing blower pressure and thereby limits movement of the injector control rod in the direction of increased fuel delivery of the injector pumps 30.

It will be understood that both the compression spring 118 of the form of fuel modulator shown in Figures 2–6 as well as the tension spring 142 of the modification of Figures 7, 8 are to be selected to have sufficient strength to overcome the force of the torsion spring 43. Similarly the tension spring 78 (Figure 2) for returning the foot accelerator has the necessary stiffness to overcome the action of torsion spring 43.

We claim:

1. A speed controlling system for an engine having a positive displacement air supercharging blower and a fuel injection pump, both mechanically driven by the engine, a fuel injection control element movable in one direction to increase pump delivery and in the opposite direction to decrease pump delivery, a member biasing said element in the direction to increase pump delivery, manual control means operatively connected to said element and including a throttle valve controlling the air supply to the blower, a member biasing said manual control means toward closed throttle position, said first named member being yieldable under the biasing action of said last named member, blower output pressure responsive means, blower intake suction responsive means, and linkage means operatively connecting each said responsive means to said element for effecting movement of said element in the direction to decrease pump delivery in response to decreasing blower output pressure and suction, respectively, independently of said manual control means.

2. A speed controlling system for an engine having a positive displacement air supercharging blower and a fuel injection pump, both driven by the engine, manual control means including a throttle valve controlling the air supply to the blower, a member biasing said manual control means toward closed throttle positions, a fuel injection control element movable in opposite directions to increase and decrease pump delivery, a member biasing said element in the direction to increase pump delivery and yieldable under the biasing action of said first named member, fluid pressure responsive means responsive to blower intake pressure, other fluid pressure responsive means responsive to blower output pressure, mechanical linkages operatively connecting each said means to said element, both said pressure responsive means having their respective linkages arranged to limit movement of said element in the direction to increase pump delivery independently of said throttle valve position and said linkage connecting said manual control means to said element.

3. In combination with an engine driven fuel injector pump having a control element movable in opposite directions to increase and decrease fuel injection, biasing means urging said element in the direction of increased fuel, a shiftable stop engageable with said element to limit its movement by said biasing means and to transmit movement to said element in opposition to said biasing means, an engine driven blower, blower intake suction responsive means operative under high engine speed conditions to effect movement of said element away from said stop means in opposition to said biasing means, and blower delivery pressure responsive means operative under reduced engine speed conditions to shift said stop and thereby transmit movement to said element in opposition to said biasing means.

4. A speed controlling system for an engine having an air supercharging blower and a fuel injection pump, both driven by the engine, a fuel injection control rod movable longitudinally in one direction to increase pump delivery and in the opposite direction to decrease pump delivery, a control rod actuating lever mounted for rotation about a fixed axis, said lever and rod having interengaged portions remote from said lever axis, manual operating means for said rod including a first member mounted for rotation about a movable axis parallel with said lever axis and having a portion engageable with said actuating lever between said lever axis and said rod to limit movement of said control rod in the increased pump delivery direction, resilient means urging said actuating lever into engagement with said first member portion, and engine speed responsive means for causing said actuating lever to move said control rod in opposition to said resilient means including a first pressure actuated piston responsive to blower intake pressure and linked to said actuating lever, a second pressure actuated piston responsive to blower delivery pressure, and a second member linked to said second pressure actuated piston and mounted for rotation about a fixed axis parallel with said lever axis, said first member being journalled by said second member and having its axis eccentric to said second member axis.

5. The invention defined in claim 4, together with a stationary abutment and resilient means interposed between said abutment and said second pressure actuated piston to resist rotation of said second member in a direction tending to advance said first member portion into engagement with said actuating member.

6. The invention defined in claim 5, wherein said abutment is adjustable to vary the resisting force of said interposed resilient means.

7. The invention defined in claim 4, wherein the eccentricity of said first and second member axes has an acute angular relation to the longitudinal axis of said actuating lever.

8. The combination in a diesel engine fuel control system, of a fuel injector pump having a control element movable in one direction to decrease fuel injection and in the opposite direction to increase fuel injection, means movably biasing said element toward the maximum fuel injection position, engine speed responsive stop means for limiting movement of said element by said biasing means, said stop means including a pivoted member having a cam surface engageable by said element, and means responsive to engine overspeeding for moving said element away from said cam surface toward the minimum fuel injection position in opposition to said biasing means.

9. The combination in a diesel engine, of a fuel injector pump having a control element movable in one direction to decrease fuel injection and in the opposite direction to increase fuel injection, resilient means movably biasing said element toward the maximum fuel injection position, a lever connected to said element and movable therewith under the biasing force of said resilient means, means including a link connected to said lever and movable in response to overspeeding of the engine to transmit movement by said lever to said element in opposition to said resilient means, manual control means for moving said element to the minimum fuel injection position against the biasing force of said resilient means including a manually movable member having a lost-motion connection with said element and other resilient means biasing said manually movable member in the direction to take up said lost motion, a pivoted member having a cam surface for limiting the movement of said element toward increased fuel injection when said manually movable member is manually moved in opposition to said other resilient means, and means including a link connected to said pivoted member and movable in response to change in engine speed to vary the extent of biased movement of said element afforded by said cam surface.

10. The combination in a diesel engine fuel control system, of a fuel injector pump having a control rod movable longitudinally in opposite directions to increase and decrease fuel injection, resilient means biasing said control rod toward a maximum fuel injection position, a control rod actuating lever mounted for rotation about an axis laterally disposed from said rod, an engine driven air supercharging blower, manual control means for limiting movement of said rod in the direction of increased fuel injection by said biasing means including a manually movable member having a lost-motion connection with said lever and other resilient means biasing said manually movable member to take-up said lost motion, a pressure actuated piston connected to said lever and movable in response to decreasing blower inlet pressure to actuate said rod toward a decreased fuel injection position in opposition to said first named biasing means and independently of said manual means, a second pressure actuated piston responsive to blower output pressure, a pivoted cam connected to said second piston, and a member carried by said rod and engageable with said cam to limit movement of said rod in the increasing fuel direction independently of both said manual means and said first named biasing means.

11. An engine fuel control system, comprising an engine driven fuel injector pump having a control element movable in opposite directions to increase and decrease fuel injection, manual control means for moving said element including a manually rotatable first shaft mounted for axial rotation and an arm rotatable with said first shaft for transmitting rotational movements thereof to said element, and means for varying the ratio of movement transmission from said arm to said element in accordance with engine speed, said last named means including an engine driven air supercharging blower, a second shaft journaling and mounted for axial rotation eccentric to said first shaft, and a fluid actuated member movable in response to blower pressure and controlling the axial rotative position of said second shaft.

12. An engine fuel control system, comprising an engine driven fuel injector pump having a control rod movable longitudinally in opposite directions to increase and decrease fuel injection, resilient means biasing said control rod toward a maximum fuel injection position, a cam having an operating surface of predetermined contour engageable with said rod to limit movement of the rod by said biasing means, said cam being movable to vary the limit of said biased movement of the rod and to drive the rod in opposition to said biasing means, cam biasing means normally effective to drive said cam and rod in opposition to said first named biasing means, an engine air supercharging blower driven in timed relation to engine operating speed, and a blower delivery pressure actuated piston connected to drive said cam in opposition to said cam biasing means whereby the limit of movement of said rod in the direction of increased fuel injection increases with increase in engine speed at a rate controlled by the contour of said cam operating surface.

13. The combination in a diesel engine fuel control system, of a fuel injector pump having a control element movable in opposite directions toward maximum and minimum fuel injection positions, engine speed responsive stop means for limiting movement of said element toward the maximum fuel injection position, other means responsive to engine overspeeding for moving said element toward the minimum fuel injection position, said other means including a member having a positive driving connection with said element, and manual control means including a manually movable member having a lost-motion connection with said first-named member.

References Cited in the file of this patent

UNITED STATES PATENTS

| | | |
|---|---|---|
| 2,031,527 | Dodson | Feb. 18, 1936 |
| 2,274,693 | Heinrich et al. | Mar. 3, 1942 |
| 2,384,282 | Chandler | Sept. 4, 1945 |
| 2,435,902 | Reggio | Feb. 10, 1948 |

FOREIGN PATENTS

| | | |
|---|---|---|
| 899,583 | France | Aug. 28, 1944 |
| 605,610 | Great Britain | July 27, 1948 |